United States Patent [19]
Wolfe et al.

[11] 4,223,879
[45] Sep. 23, 1980

[54] MACHINE TOOL VISE

[75] Inventors: Ingo E. Wolfe, Brooklyn Park; W. G. Kuban, Minneapolis, both of Minn.

[73] Assignee: Kurt Manufacturing Co., Inc., Minneapolis, Minn.

[21] Appl. No.: 43,007

[22] Filed: May 29, 1979

[51] Int. Cl.³ .............................................. B23Q 3/02
[52] U.S. Cl. ...................................... 269/32; 269/136
[58] Field of Search ........................ 269/20, 24, 27, 32, 269/134–138, 240–241, 244

[56]           References Cited
          U.S. PATENT DOCUMENTS

| | | | |
|---|---|---|---|
| 2,693,727 | 11/1954 | Olson | 269/32 |
| 2,704,002 | 3/1955 | Beausoleil | 269/32 |
| 4,043,547 | 8/1977 | Glomb et al. | 269/136 |

*Primary Examiner*—Robert C. Watson
*Attorney, Agent, or Firm*—Williamson, Bains, Moore & Hansen

[57]            ABSTRACT

A precision machine tool vise includes a body having a stationary jaw and a movable jaw mounted thereon. An actuating nut, operated by an actuating screw, engages the movable jaw and shifts the movable jaw towards and away from the fixed jaw. A cylinder housing is mounted on the vise body and bears against the outer face of the fixed jaw. The actuating screw extends through the cylinder housing and has a piston mounted thereon which is positioned within the cylinder housing. A control valve controls the flow of fluid to the cylinder housing and when actuated shifts the piston and screw towards the movable jaw. The reaction forces resulting from forward movement of the piston are transmitted from the cylinder housing to the fixed jaw and thereby prevent deflection of the fixed jaw.

4 Claims, 4 Drawing Figures

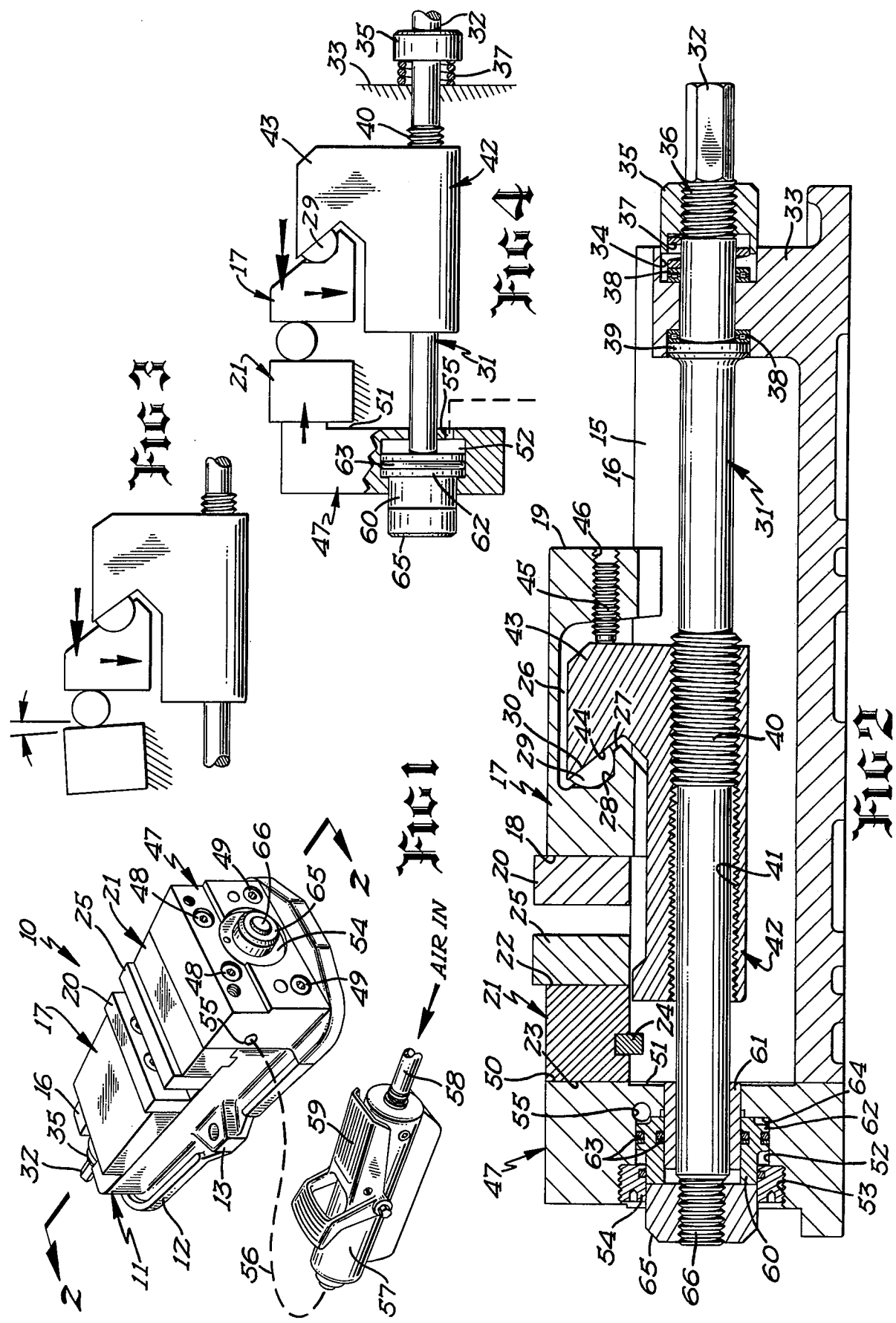

MACHINE TOOL VISE

BRIEF SUMMARY OF THE INVENTION

One of the problems associated with machine tool vises is the problem of accurately clamping the work piece in the vise in a predetermined precise position. In our earlier U.S. Pat. No. 2,880,638, the problem of deflection of the movable jaw was eliminated by the interaction of the inclined surfaces on the movable jaw and actuating nut. However, this improvement while eliminating deflection in the movable jaw, did not eliminate deflection in the fixed jaw.

Certain prior art devices have been developed which utilize external or internal deflection members connected with or engaging the fixed jaw and which receive reaction forces from the fixed jaw. These deflection members are intended to deflect in response to the reaction forces received from the movable jaw while permitting the fixed jaw to remain free of deflection. However, these prior art devices have not completely eliminated the problem of deflection of the stationary or fixed jaw.

It is therefore a general object of this invention to provide a novel precision machine tool vise with means for substantially eliminating deflection of the fixed jaw when gripping a work piece.

More specifically, the vise is provided with a piston, affixed to the movable jaw actuating screw, and positioned within a cylinder housing which engages the fixed jaw. The piston when shifted in response to operation of a valve produces reaction forces in the cylinder which are transmitted to the fixed jaw and prevents deflection thereof.

These and other objects and advantages of this invention will more fully appear from the following description made in connection with the accompanying drawings, wherein like reference characters refer to the same or similar parts throughout the several views.

BRIEF DESCRIPTION OF THE DRAWINGS

FIG. 1 is a perspective view of my novel precision machine tool vise.

FIG. 2 is an enlarged transverse sectional view of the device.

FIG. 3 is a diagrammatic view illustrating deflection of the fixed jaw when the present invention is not employed, and FIG. 4 is a diagrammatic view similar to FIG. 3 but illustrating the manner in which the fixed jaw is preventing from deflecting through the use of the present invention.

DESCRIPTION OF THE PREFERRED EMBODIMENT OF THE INVENTION

Referring now to the drawings and more specifically to FIG. 1, it will be seen that one embodiment of my novel vise, designated generally by the reference numeral 10, is thereshown. The vise 10 includes a body 11 comprised of a base 12 preferably formed of high ductile cast iron and provided with a pair of outwardly projecting embossed elements 13, each having an aperture 14 therein through which suitable nut and bolt assemblies project to permit mounting of the vise upon a suitable machine. The body 11 includes a pair of upstanding laterally spaced apart slide structures 15 which project upwardly from the base. The upper surface of the slide structures are machined and hardened by flame treatment to define smooth guideways upon which is slidably mounted the movable jaw 17.

The movable jaw 17 is of generally rectangular configuration and has a substantially flat front face 18 and a substantially flat rear face 19. The movable jaw is provided with a generally rectangular flat jaw plate 20, which, as shown, is detachably secured to the front face by suitable bolts. The rear face is also provided with threaded recesses therein to permit the jaw plate to be selectively secured to either the front or rear face thereof.

A generally rectangular stationary jaw 21 is rigidly affixed to the slide structures 15 of the body adjacent the outer end thereof, and the stationary jaw is disposed in confronting opposed relation with respect to the movable jaw 17. Although not shown in the drawing the stationary jaw is secured to the body by means of bolts which project upwardly through vertical openings in the slide structure and threadedly engage in threaded recesses in the stationary jaw 21. The stationary jaw 21 also has rectangular recesses in the lower surface thereof for accomodating keys 24 which are positioned within corresponding recesses in the slide structure 15.

The stationary jaw 21 has a substantially flat front face 22 and a substantially flat rear face 23 both having threaded recesses therein for permitting attachment of a substantially flat rectangular jaw plate 25 thereto. It will be noted that the jaw plate 25 has been illustrated as attached to the front face 22 of the stationary jaw.

The movable jaw 17 has a downwardly facing recess 26 therein which defines a generally upwardly inclined surface 27. The inclined surface 27 has a smaller generally hemispherical upwardly facing recess 28 therein which accommodates a hemispherical element 29. The hemispherical element 29 has its flat surface 30 arranged in inclined relation adjacent the inclined surface 27.

An elongate actuating shaft 31 having a hexagonal outer end 32 projects through a cast bearing 33 which is integrally formed with the slide structures 15 and the base 12. The cast bearing has a pair of generally cylindrical recesses 34 on opposite sides thereof, each recess actually constituting an enlargement of the bore through the cast bearing. An internally threaded collar 35 threadedly engages a threaded portion 36 of the shaft and this collar 35 projects into one of the recesses 34. A helical spring 37 is positioned around the shaft 31 and has one end thereof bearing against the collar 35 and has its other end bearing against a roller thrust bearing 38 which engages a cast bearing 33. A second roller thrust bearing 38 is interposed on the other side of the cast bearing and engages a flange 39 integrally formed with the shaft 31 and projecting outwardly therefrom.

The shaft 31 is provided with intermediate threads 40 which threadedly engage a threaded bore 41 of an actuating nut 42 which is positioned between a slide structure 15 and is movable longitudinally of the base 12. The actuating nut 42 has shoulders extending longitudinally along the upper surface thereof and these shoulders engage longitudinally extending downwardly facing shoulders on the slide structures 15. Thus it will be seen that the actuating nut 42 is supported on the shaft 31 and is held against the downwardly facing shoulders of the slide structures 15.

The actuating nut 42 has an upwardly projecting portion 43 which projects into the recess 26 of the movable jaw 17. The upwardly projecting portion 43 has an inclined face 44 which is disposed in confronting and engaging relation with the flat surface 30 of the hemispherical element 29. A threaded adjusting screw 45 which threadedly engages in a threaded bore 46 through the rear face of the movable jaw 17 engages the nut 42 to urge and retain the same in an engaging relation with respect to the flat surface 30 of the hemispherical element 29. It will therefore be seen that when the shaft 31 is revolved, the actuating nut will be shifted longitudinally of the body 11 which produces movement of the movable jaw towards and away from the stationary jaw. It will be appreciated that the interaction of the inclined surfaces on the actuating nut and the movable jaw produce a downward component force which eliminates deflection in the movable jaw.

Means are also provided for eliminating deflection of the stationary jaw and to this end, it will be seen that a substantially rectangular shaped cylinder housing 47 is positioned against the outer end of the body 11 and against the rear or other face 23 of the stationary jaw 21. The cylinder housing 47 is provided with suitable apertures therein for accommodating bolts 48 that threadedly engage in threaded apertures in the body 11 for securing the cylinder housing to the body. The cylinder housing 47 also has apertures therein for accommodating bolts 49 but threadedly engage in threaded apertures in the stationary jaw 21. Thus the cylinder housing 47 is fixedly secured to both the stationary jaw and body 11.

The cylinder housing 47 is provided with a substantially flat front face 50 which has a recess 51 therein adjacent its mid-portion so that the front face 50 engages only the rear face 23 of the stationary jaw and engages only the base 12 of the body 11. The cylinder housing 47 also has a cylindrical chamber 52 therein which communicates with an enlarged annular threaded recess 53. An externally threaded end cap 54 threadedly engages the threaded recess 53 and forms the rear wall of the chamber 52.

A port 55 extends through the cylinder housing 47 and intercommunicates the chamber 52 with one end of a conduit 56, the other end of the conduit being connected in communicating relation with a pedal typed valve 57. The pedal type valve 57 is also connected to a supply conduit 58 which in turn is connected to a source of fluid such as hydraulic fluid under pressure. An actuating pedal 59 is pivotally mounted on the valve 57 and when depressed in one direction intercommunicates the chamber 52 with a source of fluid under pressure. When the actuator pedal 59 is depressed in the other direction the valve 57 will be closed and fluid will return from the chamber 52.

A sleeve type piston 60 is concentrically disposed on a sleeve bearing 61 which in turn is positioned concentrically around the shaft 31. The piston 60, which is positioned within the chamber 52, has an outturned portion of flange 62 which extend outwardly and engage the inner surfaces of the chamber 52. The piston is provided with a pair of annular seals 63, one of which sealingly engages the inner surface of the chamber 52 while the other sealingly engages the sleeve bearing 61.

The inner end of the chamber 52 is defined by a radial face 64 which is engaged by one end of the piston 60. The other end of the piston engages a nut 65 which is threadedly mounted on the threaded outer end 66 of the shaft 31. The nut 65 is slidably positioned within the cap 54 which is provided with an internal bore 67. It will also be noted that the internal bore 67 also receives and engages the exterior surface of the piston 60, and is provided with a suitable annular sealing element which engages the exterior surface of the piston in sealing relation therewith.

In operation, the movable jaw will be shifted towards the stationary jaw by revolving the shaft 31. A work piece will be gripped by the stationary and movable jaws as shown in FIGS. 3 and 4. In prior art devices, as the work piece is gripped more tightly between the movable and fixed jaws, there will be a tendency of the stationary jaw to deflect as illustrated in FIG. 3. This is true even though deflection has been eliminated from the movable jaw. Therefore precision work cannot be done on the work piece even though deflection in the stationary jaw is only slight. Obviously, the deflection has been exaggerated in FIG. 3 in order to more clearly illustrate the advantages of the present invention.

The work piece is placed between the stationary and movable jaw and the actuator pedal 59 is depressed in one direction to supply fluid under pressure to the chamber 52. It will be noted that the inner face of the outturned portions 62 of the piston is spaced from the radial face 64 of the chamber and when fluid pressure is supplied to the chamber, the piston 60 will be shifted away from the radial face and to the left as viewed in FIG. 2.

Shifting movement of the piston urges the nut 65 and the shaft 31 also towards the left or towards the stationary jaw to tightly grip the work piece between the fixed and movable jaws. Opposite reaction forces are produced in the cylinder housing in response to the movement of the piston and these reaction forces are transmitted directly to the entire rear face 23 of the stationary jaw and to the base only of the body. Thus any tendency of the stationary jaw to deflect is canceled or overcome by the reaction forces produced by movement of the piston. Because of the space or recess 51, the entire area of the adjacent face of the fixed jaw is engaged and subjected to the reaction forces which prevents any deflection of the fixed jaw during tightening.

With this arrangement, substantially all deflection is removed from both the movable jaw as well as the stationary jaw. Fluid pressure to the chamber 52 will be reversed when the pedal 59 is depressed in the opposite direction. The spring 37 will assist in the return of the shaft 31.

It will therefore be seen that through the use of the present vise, an operator may be able to perform high precision work on a work piece since the present vise substantially eliminates deflection of both the stationary and movable jaws.

Thus it will be seen that I have provided a novel precision machine tool vise which is of simple and inexpensive construction and operation, and which functions in a more efficient manner than any heretofore known comparabe vise.

While the preferred embodiments of the present invention have been described, it should be understood that various changes, adaptations, and modifications may be made therein without departing from the spirit of the invention and scope of the appended claims.

We claim:

1. A precision machine vise comprising:
    an elongate body including an elongate base having a pair of laterally spaced, upstanding slide structures secured thereto and projecting therefrom,
    a stationary jaw mounted on said slide structures and having an inner face and an outer face, a movable jaw mounted on said slide structures for sliding movement towards and away from the said stationary jaw, an actuating nut being shiftable relative to said body for moving said movable jaw, interlocking inclined surfaces on said movable jaw and actuating nut whereby the nut imparts a downward component of force on the movable jaw as the latter is urged into gripping relation with a work piece gripped between the jaws, a cylinder housing secured to one end of said body and having bearing engagement only with the outer face of said stationary jaw and one end of said base, said housing having a cylindrical chamber therein connected in communicating relation with a source of fluid under pressure, an elongate revolvable actuating screw extending through said body and said cylinder housing and threadedly engaging said actuating nut for shifting the same, a piston mounted on said screw and positioned in said chamber, a control valve connected in communicating flow controlling relation with said source of fluid pressure and said cylinder and when operated supplying fluid to the cylinder to axially shift the screw in a forward direction toward said stationary jaw, a resilient means engaging the screw and returning the same in a rearward direction when the valve is rendered inoperative.

2. The vise as defined in claim 1 wherein said cylinder housing has a substantially planar front face having a recessed central portion whereby said front face of said housing engages substantially the entire outer face of said stationary jaw and only an end portion of said base whereby reaction forces produced by movement of the piston will be transmitted to one end of the base and the outer face of the fixed jaw to prevent the latter from deflecting away from the movable jaw.

3. The vise as defined in claim 1 wherein said piston comprises a sleeve positioned on said actuating screw whereby the latter is revolvable relative to said piston.

4. The vise as defined in claim 1 wherein said resilient means comprises a helical spring engaging said actuating screw and said vise body.

* * * * *